(12) United States Patent
Desbois et al.

(10) Patent No.: US 10,611,889 B2
(45) Date of Patent: Apr. 7, 2020

(54) METHOD FOR PRODUCING IMPREGNATED FIBER STRUCTURES

(71) Applicants: BASF SE, Ludwigshafen (DE); VOLKSWAGEN AG, Wolfsburg (DE)

(72) Inventors: Philippe Desbois, Edingen-Neckarhausen (DE); Andreas Wollny, Freinsheim (DE); Max Ehleben, Braunschweig (DE); Maurice Bitterlich, Meine (DE); Katja Zeuner, Braunschweig (DE)

(73) Assignee: BASF SE, Ludwigshafen am Rhein ( * ) Notice: Subject to any disclaimer, the term of this patent is extended or adjusted under 35 U.S.C. 154(b) by 266 days.

(21) Appl. No.: 15/501,034

(22) PCT Filed: Jul. 29, 2015

(86) PCT No.: PCT/EP2015/067423
§ 371 (c)(1),
(2) Date: Feb. 1, 2017

(87) PCT Pub. No.: WO2016/016328
PCT Pub. Date: Feb. 4, 2016

(65) Prior Publication Data
US 2017/0226301 A1    Aug. 10, 2017
US 2018/0094109 A9    Apr. 5, 2018

(30) Foreign Application Priority Data
Aug. 1, 2014 (EP) .................................... 14179515

(51) Int. Cl.
*B29B 15/12* (2006.01)
*B29C 70/16* (2006.01)
(Continued)

(52) U.S. Cl.
CPC ............... *C08J 5/24* (2013.01); *B29B 15/122* (2013.01); *B29C 70/16* (2013.01); *B29C 70/504* (2013.01);
(Continued)

(58) Field of Classification Search
CPC ..... B29B 15/12; B29B 15/122; B29B 15/127; B29C 70/12; B29C 70/16; B29C 70/20;
(Continued)

(56) References Cited

U.S. PATENT DOCUMENTS 3,639,202 A * 2/1972 Simon .................... B29C 70/00
156/243
2012/0088899 A1 * 4/2012 Scherzer ................ C08G 69/14
528/325

(Continued)

FOREIGN PATENT DOCUMENTS

CN    1646308 A        7/2005
JP    08318530 A  *  12/1996
(Continued)

OTHER PUBLICATIONS

International Search Report issued in International Application PCT/EP2015/067423 dated Sep. 28, 2015.

*Primary Examiner* — Michael A Tolin
(74) *Attorney, Agent, or Firm* — Armstrong Teasdale LLP (57) ABSTRACT

The invention relates to a process for the production of saturated fiber structures. The process includes (a) introduction of a fiber structure onto a conveyor belt; (b) application of a solution including monomer and optionally including activator, and optionally including catalyst in at least one line to the fiber structure; (c) passage of the fiber structure with the solution through at least one roll pair in which pressure is exerted on the fiber structure; and (d) cooling of the saturated fiber structure, so that the monomer solidifies.

14 Claims, 4 Drawing Sheets

(51) Int. Cl.
| | |
|---|---|
| *B29C 70/50* | (2006.01) |
| *C08J 5/24* | (2006.01) |
| *B32B 5/02* | (2006.01) |
| *B32B 7/12* | (2006.01) |
| *B32B 9/00* | (2006.01) |
| *B32B 17/00* | (2006.01) |
| *B32B 37/10* | (2006.01) |
| *B32B 37/12* | (2006.01) |
| *C08J 5/04* | (2006.01) |
| *B29K 105/00* | (2006.01) |
| *B29K 77/00* | (2006.01) |
| *B29K 105/08* | (2006.01) |
| *B29K 307/04* | (2006.01) |
| *B29K 309/08* | (2006.01) |

(52) U.S. Cl.
CPC ............... *B32B 5/02* (2013.01); *B32B 7/12* (2013.01); *B32B 9/007* (2013.01); *B32B 17/00* (2013.01); *B32B 37/10* (2013.01); *B32B 37/12* (2013.01); *C08J 5/04* (2013.01); *B29K 2077/00* (2013.01); *B29K 2105/0002* (2013.01); *B29K 2105/0809* (2013.01); *B29K 2307/04* (2013.01); *B29K 2309/08* (2013.01); *B32B 37/1292* (2013.01); *B32B 2260/046* (2013.01); *B32B 2262/101* (2013.01); *B32B 2262/106* (2013.01); *B32B 2377/00* (2013.01); *C08J 2377/02* (2013.01)

(58) Field of Classification Search
CPC ....... B29C 70/22; B29C 70/228; B29C 70/50; B29C 70/504; B29K 2077/00; B29K 2105/0002; B29K 2105/0809; B32B 5/022; B32B 5/024; B32B 5/026; B32B 5/12; B32B 37/10; B32B 37/1292; B32B 2260/046; B32B 2262/0269; B32B 2262/101; B32B 2262/106; B32B 2377/00; C08J 5/24
See application file for complete search history.

(56) References Cited

U.S. PATENT DOCUMENTS

| | | | |
|---|---|---|---|
| 2012/0107509 A1* | 5/2012 | Scherzer | B29C 67/246 427/381 |
| 2012/0222809 A1* | 9/2012 | Scherzer | B05D 3/12 156/305 |
| 2013/0221555 A1* | 8/2013 | Radtke | B29C 45/0005 264/28 |
| 2014/0154937 A1* | 6/2014 | Desbois | C08J 5/24 442/58 |
| 2014/0263759 A1* | 9/2014 | Schwartau | B05B 1/20 239/557 |
| 2015/0145165 A1* | 5/2015 | Zhang | D06M 15/51 264/257 |

FOREIGN PATENT DOCUMENTS

| | | |
|---|---|---|
| WO | 03/053661 A1 | 7/2003 |
| WO | 2012116947 A1 | 9/2012 |
| WO | 2014057254 A1 | 4/2014 |
| WO | 2014086757 A2 | 6/2014 |

* cited by examiner

METHOD FOR PRODUCING IMPREGNATED FIBER STRUCTURES

CROSS-REFERENCE TO RELATED APPLICATIONS

This application is a U.S. National Phase Application of PCT/EP2015/067423, filed Jul. 29, 2015, which claims the benefit of priority to EP Application No. 14179515.3, filed Aug. 1, 2014, the contents of which are hereby expressly incorporated by reference in their entirety.

The invention relates to a process for the production of saturated fiber structures, comprising the following steps:
(a) introduction of a fiber structure onto a conveyor belt,
(b) application of a solution comprising monomer and optionally comprising activator, and optionally comprising catalyst,
(c) passage of the fiber structure with the solution through at least one roll pair in which pressure is exerted on the fiber structure,
(d) cooling of the fiber structure, so that the monomer solidifies.

Saturated fiber structures are used in the production of components made of reinforced polymers, for example thermoplastic polymers. By decoupling the production of the semifinished product from the production of the finished component it is possible to reduce the individual machine running times and also to use less storage capacity, since the semifinished products, in particular if they take the form of sheets, require much less space than three-dimensionally molded finished components.

An example of a known method for the production of flat fiber-reinforced semifinished products in WO-A 2012/116947 saturates a fiber structure with a mixture of molten lactam, catalyst, and optionally activator, cools the structure in a following step, and further processes the cooled fiber structure to give the flat fiber-reinforced semifinished product. In WO-A 2012/116947 by way of example slot nozzles are used for the saturation of the fiber structure.

WO-A 03/053661 discloses another process for the production of composite materials with thermoplastic matrix. Here, a fiber structure is likewise saturated with a lactam melt, but the saturated fiber structure is then heated in order to polymerize the lactam to give the polyamide.

Slot nozzles are usually used for the saturation or impregnation of the fiber structures. In another known alternative, the saturation is carried out in an immersion bath, or saturation or coating of the fiber structure is achieved by a spray-application or trickle-application process, or by doctoring. However, the use of immersion baths is not advisable in particular when reactive systems are used, for example for saturation with lactam for the production of polyamide, since the lactam would polymerize prematurely in the immersion bath. The use of slot nozzles for the distribution of the lactam has the disadvantage that, because of the geometry of the nozzles, some of the mixture comprising lactam remains for a relatively long time in the nozzle, where it starts to polymerize and thus blocks the nozzle.

It is therefore an object of the present invention to provide a process for the production of saturated fiber structures which does not have the disadvantages known from the prior art.

The object is achieved via a process for the production of saturated fiber structures, comprising the following steps:
(a) introduction of a fiber structure onto a conveyor belt,
(b) application of a solution comprising monomer and optionally comprising activator, and optionally comprising catalyst,
(c) passage of the fiber structure with the solution through at least one roll pair in which pressure is exerted on the fiber structure,
(d) cooling of the fiber structure, so that the monomer solidifies,
which comprises applying the solution comprising monomer and optionally comprising activator, and optionally comprising catalyst in at least one line to the fiber structure.

The application in at least one line to the fiber structure is usually achieved by using a round nozzle with an aperture of small diameter. By virtue of the design of the nozzle it is possible in contrast to the use, known from the prior art, of slot nozzles, to avoid hold-up and polymerization of monomer in the nozzle with resultant nozzle blockages.

In the invention, the fiber structure with, applied thereto, the solution comprising monomer and optionally comprising activator, and optionally comprising catalyst is passed through the roll pair before the fiber structure with the solution has cooled to the extent that the viscosity of the solution rises or the monomer has dried. By virtue of the low viscosity of the solution, the pressure exerted on the fiber structure achieves uniform distribution, within the fiber structure, of the solution comprising monomer and optionally comprising activator, and optionally comprising catalyst.

The transport of the fiber structure can be achieved either without support or with the aid of a conveyor belt. Preference is given to transport with the aid of a conveyor belt. In this case the fiber structure is first applied to a conveyor belt, and is conveyed thereby through the system. There is no need for the use of a conveyor belt if the intention is to laminate the fiber structure to a foil. In this case the lamination foil can be utilized as conveyor belt. It is also possible to omit a conveyor belt when fiber structures used are designed so that the solution comprising monomer and optionally comprising activator, and optionally comprising catalyst does not drip after application and before reaching the roll pair. However, fiber structures not having this property require the use of a conveyor belt in order to retain the necessary quantity of solution in the fiber structure.

The distribution of the solution in the fiber structure can by way of example be adjusted via adjustment of the distance between the rolls of the roll pair and thus adjustment of the pressure exerted on the fiber structure with the solution.

In order that the solution comprising monomer and optionally comprising activator, and optionally comprising catalyst is uniformly distributed in the fiber structure on passage of the fiber structure through the roll pair, in one embodiment of the invention the rolls of the roll pair are not heated. This avoids onset of polymerization of the monomer due to high temperature of the rolls, where the resultant viscosity of the monomer is too high for uniform distribution in the fiber structure.

In order to avoid blockage of the nozzle due to non-uniform flow, it is preferable that the aperture cross section of the nozzle is circular. It is preferable that the aperture diameter of the nozzle for the application of the solution comprising monomer and optionally comprising activator, and optionally comprising catalyst is at most 5 mm. It is further preferable that the aperture diameter of the nozzle is at most 2 mm, and it is particularly preferable that the aperture diameter of the nozzle is at most 1 mm, and in particular at most 0.5 mm.

If the flow rate of the solution is sufficiently high, the small diameter of the nozzle is sufficient to introduce enough solution into the fiber structure. If the width of the fiber structure is so great that it is not possible for one nozzle to apply sufficient solution comprising monomer and optionally comprising activator, and optionally comprising catalyst, it is moreover possible to provide more than one nozzle.

The manner of application of the line to the fiber structure can be such that the line is straight, or has an undulating or zigzag shape.

In one preferred embodiment, the line is central in the fiber structure. If a plurality of lines are applied the distance between the individual lines is preferably equal, and the distance between the outermost lines and the periphery of the fiber structure is half as great as the distance between two lines. Appropriate application of the solution comprising monomer and optionally comprising activator, and optionally comprising catalyst gives uniform distribution of the solution in the fiber structure. The solution can become uniformly distributed in the fiber structure and on passage through the roll pair continues to become uniformly distributed, thus giving a uniformly distributed quantity of solution in the entire fiber structure.

If the line applied has an undulating or zigzag shape, it is moreover possible that the application method causes the lines to intersect. It is particularly preferable here that, for all intersecting lines, the respective inflection points at which the direction of application changes are on a line running in the direction of transport of the fiber structure. If an even number of lines having an undulating or zigzag shape is applied, it is further preferable that the lines are applied with axial symmetry with respect to an axis running in the direction of transport of the fiber structure. The lines here can intersect or can respectively run on one side of the axis of symmetry. In another possible application method here, a plurality of line systems respectively with overlapping lines are applied alongside one another to the fiber structure. The individual line systems here can have axial symmetry or can comprise overlapping lines running in parallel. It is preferable here that there is no contact between, or intersection of, the individual line systems.

For uniform distribution of the solution comprising monomer and optionally comprising activator, and optionally comprising catalyst, it is further advantageous that the distance between nozzle and fiber structure is at most 500 mm. Particular preference is given to a distance in the range from 5 to 10 mm between nozzle and fiber structure. Use of an appropriately small distance avoids unintended spray effects during the application of the solution comprising monomer and optionally comprising activator, and optionally comprising catalyst, with the result that a cleanly defined line of the solution is applied to the fiber structure.

In one preferred embodiment, the distance between the application of the solution in step (b) and the roll pair through which the fiber structure is passed in step (c) is at most 3 m. It is further preferable that the distance between application of the solution and the roll pair is at most 2 m. It is particularly preferable that the distance between the position at which the solution is applied and the roll pair is in the range from 0.2 to 1 m. The distance here is the distance between the point at which the solution encounters the fiber structure and the point at which the fiber structure intersects the line connecting the centers of the rolls of the roll pair.

Uniform distribution of the solution in the fiber structure on application of the solution in the process of the invention is achieved only if the viscosity of the solution is sufficiently low. It is therefore preferable that the viscosity of the solution comprising monomer and optionally comprising activator, and optionally comprising catalyst is in the range from 5 to 500 mPas. Particular preference is given to a viscosity of the solution in the range from 10 to 100 mPas, in particular in the range from 15 to 40 mPas.

Further adjustment of the viscosity is possible if a temperature-controllable transport roll is provided below the fiber structure in the region of the location where the solution is applied. If a conveyor belt is provided, the conveyor belt is passed over the temperature-controllable transport roll. Without conveyor belt, the fiber structure comes into direct contact with the temperature-controllable transport roll. The temperature of the temperature-controllable transport roll is adjusted in accordance with the viscosity desired for the application of pressure in step (c), and is in the range from −30 to 100° C., preferably in the range from 0 to 90° C., and in particular in the range from room temperature to 80° C. The lower the intended viscosity of the solution here, the higher the temperature selected.

In order to avoid crystallization of lactam during application, it is also possible to heat the fiber structure before the application of the solution comprising monomer and optionally comprising activator, and optionally comprising catalyst, preferably to a temperature above the melting point of the lactam.

The distance between the rolls of the roll pair for the application of pressure to the fiber structure is selected as a function of the thickness of the fiber structure and the quantity of solution comprising monomer and optionally comprising activator, and optionally comprising catalyst. The greater the quantity of solution and the smaller the required pressure for uniform distribution of the solution, the greater the possible distance between the rolls. The distance between the rolls is preferably selected in such a way that the distance between the rolls of the roll pair is from 1 to 1.5 times the thickness of the fiber structure.

If a conveyor belt is provided for the transport of the fiber structure, the positioning of the roll pair for the application of pressure in step (c) is preferably such that the fiber structure is passed together with the conveyor belt through the roll pair. The distance between the rolls of the roll pair here must be sufficiently great to take account of the thickness of the conveyor belt, and the distance between the rolls is therefore from 1 to 1.5 times the thickness of the fiber structure plus the thickness of the conveyor belt. The desired pressure that is required on the fiber structure for uniform distribution of the solution is thus also achieved when a conveyor belt is used.

The flow rate of the solution comprising monomer and optionally comprising activator, and optionally comprising catalyst and the transport velocity of the fiber structure are preferably selected in such a way that after passage of the saturated fiber structure through the roll pair in step (c) the content of fibers in the saturated fiber structure is from 20 to 70% by volume. It is particularly preferable that the content of fibers in the saturated fiber structure is in the range from 30 to 60% by volume, and in particular in the range from 40 to 55% by volume. The content of fibers here depends on the desired use of the saturated fiber structure produced by the process of the invention.

The process of the invention is particularly suitable for the production of monomer-saturated fiber structures which can be further processed in a subsequent process to give a component made of a fiber-reinforced polymer. It is particularly preferable to use the process to produce monomer-saturated fiber structures which can be used for the production of components made of fiber-reinforced thermoplastic polymers, in particular made of fiber-reinforced polyamides. To this end it is preferable that the monomer is selected from the group of the lactams, optionally mixed with up to 50% by volume of monomers from the group of the lactones.

The monomer is preferably selected from the group comprising caprolactam, piperidone, pyrrolidone, lauryllactam, and mixtures of these. It is particularly preferable to use a monomer selected from the group comprising caprolactam, lauryllactam, and mixtures of these.

If lactones are also admixed, these are copolymerized during polymerization to give the polyamide with the monomer selected from the group of the lactams. It is preferable to use caprolactone as lactone.

Compounds suitable as optional activator are inter alia aliphatic diisocyanates such as butylene diisocyanate, hexamethylene diisocyanate, octamethylene diisocyanate, decamethylene diisocyanate, undecamethylene diisocyanate, dodecamethylene diisocyanate, and also aromatic diisocyanates such as tolylene diisocyanate, isophorone diisocyanate, methylene-4,4'-bis(phenyl isocyanate), methylene-4,4'-bis(cyclohexyl isocyanate), or polyisocyanates such as isocyanurates of hexamethylene diisocyanate, obtainable by way of example as Basonat® HI 100 from BASF SE, allophanates such as ethyl allophanate, and mixtures of these. Hexamethylene diisocyanate and isophorone diisocyanate, in particular hexamethylene diisocyanate, are preferred as activator. The diisocyanates can be replaced by monoiso-cyanates.

Compounds alternatively suitable as activator are aliphatic diacyl halides such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, and also aromatic diacyl halides such as toluyl chloride, toluyl bromide, isophoronedioyl chloride, isophoronedioyl bromide, 4,4'-methylenebis(phenyloyl chloride), 4,4'-methylenebis(phenyloyl bromide), 4,4'-methylenebis(cyclohexyloyl chloride), 4,4'-methylenebis(cyclohexyloyl bromide), and mixtures of these, preferably hexamethylenedioyl chloride or hexamethylenedioyl bromide, or a mixture of these, particularly preferably hexamethylenedioyl chloride. The diacyl halides can be replaced by monoacyl halides.

Examples of compounds suitable as optional catalyst are sodium caprolactamate, potassium caprolactamate, magnesium bromide caprolactamate, magnesium chloride caprolactamate, magnesium biscaprolactamate, sodium hydride, sodium metal, sodium hydroxide, sodium methoxide, sodium ethoxide, sodium propoxide, sodium butoxide, potassium hydride, potassium metal, potassium hydroxide, potassium methoxide, potassium propoxide, potassium butoxide, preferably sodium hydride, sodium metal, sodium caprolactamate, particularly preferably sodium caprolactamate, obtainable by way of example as Bruggolen® C 10, a solution of 18% by weight of sodium caprolactamate in caprolactam).

The molar ratio of lactam to the catalyst can be varied widely, and is generally from 1:1 to 10 000:1, preferably from 10:1 to 1000:1, particularly preferably from 50:1 to 300:1.

The molar ratio of activator to the catalyst can likewise be varied widely and is generally from 100:1 to 1:10 000, preferably from 10:1 to 1:100, particularly preferably from 1:1 to 1:10.

The lactam can also comprise other additives, alongside the catalyst and the activator. The other additives are added in order to adjust the properties of the polyamide produced from the lactam. Examples of usual additives are plasticizers, impact modifiers, crosslinking agents, dyes, or flame retardants. The additives usually used in the production of polyamides can be used here.

In order that the viscosity of the solution comprising monomer and optionally comprising activator, and optionally comprising catalyst is sufficiently low for uniform distribution in the fiber structure it is preferable that the temperature used for applying the solution is in the range from 80 to 120° C. The temperature of the roll pair used to apply pressure to the fiber structure with the solution applied thereto is preferably at most 100° C., and the temperature of the roll pair is particularly preferably in the range from 40 to 60° C.

For the purposes of the present invention, the fiber structure is by way of example a woven fabric, laid scrim, nonwoven, knitted fabric, or braided fabric, or is composed of rovings. The woven fabric, laid scrim, nonwoven, knitted fabric or braided fabric, or the fiber structure composed of rovings can be used here in one or more layers. Preference is given to more than one layer. For the purposes of the present invention, laid scrims comprise one or more layers of parallel-oriented fibers, yarns, threads, or cords, where the individual layers of the parallel-oriented fibers, yarns, threads, or cords can be at an angle to one another. It is preferable that the fiber structure takes the form of woven fabric or laid scrim.

When, in the case of laid scrims, the layers used of parallel-oriented fibers, yarns, threads, or cords are at an angle to one another, it is particularly preferable that the angle between the individual layers is in each case 90° (bidirectional structure). When three layers, or a multiple of three layers, is/are used it is also possible to arrange the individual layers at an angle of 60° to one another, and when four layers, or a multiple of four layers, is/are used it is also possible to arrange the individual layers at an angle of 45° to one another. It is also possible moreover to provide more than one layer of fibers with identical orientation. It is likewise possible here that there are layers at an angle to one another, and the number of layers here with fibers of identical orientation can be different in each of the orientations of the fibers, an example being four layers in a first direction and one layer in a direction at an angle of by way of example 90° thereto (bidirectional structure with preferential direction). There is moreover also a known quasi-isotropic structure in which the fibers of a second layer are arranged at an angle of 90° to fibers of a first layer and fibers of a third layer are moreover arranged at an angle of 45° to the fibers of the second layer.

It is particularly preferable to use fiber structures with from 2 to 10 layers, in particular from 2 to 6 layers, for the production of the saturated fiber structure.

The fibers of the fiber structure are preferably fibers made of inorganic materials such as carbon, for example in the form of low-modulus carbon fibers or high-modulus carbon fibers, silicatic and non-silicatic glasses of very many different types, basalt, boron, silicon carbide, potassium titanate, metals, metal alloys, metal oxides, metal nitrides, metal carbides, and silicates, or else organic materials such as natural and synthetic polymers, for example polyacrylonitriles, polyesters, ultrahigh-draw polyolefin fibers, polyamides, polyimides, aramids, liquid-crystal polymers, polyphenylene sulfides, polyether ketones, polyether ether ketones, and polyetherimides. Particular preference is given to glass fibers, carbon fibers, aramid fibers, steel fibers, potassium titanate fibers, basalt fibers, ceramic fibers, and/or other polymeric fibers or filaments adequately resistant to temperature change.

The fiber structure can also have been pretreated with a size in order to obtain better adhesion of the solution comprising monomer and optionally comprising activator, and optionally comprising catalyst. The use of the size also improves the adhesion of the polymer after reaction of the monomer to give the polymer. The pretreatment with the size here can take place before production of the fiber structure has ended, or indeed before production of the fiber has ended.

Because the lactam-saturated fiber structure is moisture-sensitive it is preferable to laminate the fiber structure. Polymer foils or metal foils are usually used for this purpose.

For lamination of the fiber structure it is possible by way of example to apply the fiber structure to a foil before the application of the solution comprising monomer and optionally comprising activator, and optionally comprising catalyst. An example of a suitable foil is a polyamide foil. The use of the foil has the further advantage that it is thus possible to produce high-quality surfaces which can be used, for example, as visible surface. It is moreover also possible, as described above, to utilize the foil as conveyor belt.

In one embodiment for the lamination process a foil, preferably likewise a polyamide foil, is applied to the fiber structure with the applied solution before or after passage through the roll pair, preferably before passage through the roll pair. A high-quality surface is likewise obtained by this method, and can be used as visible surface. It is particularly preferable that the foil is applied to the fiber structure when, before the application of the solution, the fiber structure has been placed onto a foil. There is thus a foil applied not only on the underside but also on the upper side of the saturated fiber structure, and both sides of the fiber structure therefore have a high-quality surface which can be utilized as visible surface.

It is also possible to utilize any other desired polymer foil or metal foil, alongside a polyamide foil. However, only when polyamide foils or polyester foils are used is it possible to process the foil concomitantly during the further processing of the saturated fiber structure. Foils made of any other material have to be removed prior to further processing.

In addition to, or as alternative to, the application of the foil it is possible to further process the saturated fiber structure after cooling and then to weld it into foils. This firstly permits protection of the further-processed saturated fiber structure, and secondly can provide a further improvement of the surface.

The lamination has the further advantage that water, which can deactivate the catalyst, is prevented from diffusing into the saturated fiber structure. The use of welding in relation to the further-processed saturated fiber structure further amplifies this effect, and also seals the edges of the saturated fiber structure so that no water can penetrate here either. The shelf life of the semifinished product is thus increased.

The foil into which the further-processed saturated fiber structure is welded can be any desired foil that is impermeable to water. It is preferable to use polyamide foils or polyester foils. If foils made of a material other than polyamide or polyester are used, it is generally necessary—as is the case with the foil used for lamination—to remove the foil from the saturated fiber structure prior to further processing. The use of polyamide foil and optionally of polyester foil, permitting further processing together with the foil, allows easier handling, which is particularly desirable in the industrial sector.

The saturated fiber structure produced by the process of the invention can then be further processed in another process to give a finished component. To this end it is possible by way of example to insert the saturated fiber structure into a mold in which the saturated fiber structure is subjected to a forming process to give the component. Examples of suitable forming processes are thermoforming processes or compression processes.

For the production of the component, the saturated fiber structure is heated in the mold to a temperature at which the monomer, in particular the lactam, polymerizes to give the polymer, in particular to give the polyamide. The temperature of the mold here is preferably in the range from 100 to 200° C., more preferably in the range from 120 to 180° C., and in particular in the range from 140 to 179° C. The catalyst comprised in the lactam catalyzes the anionic polymerization to give the polyamide, and remains in the resultant polyamide after the polymerization reaction.

An embodiment of the invention is depicted in the figures and is explained in more detail in the description below.

Figure 1:
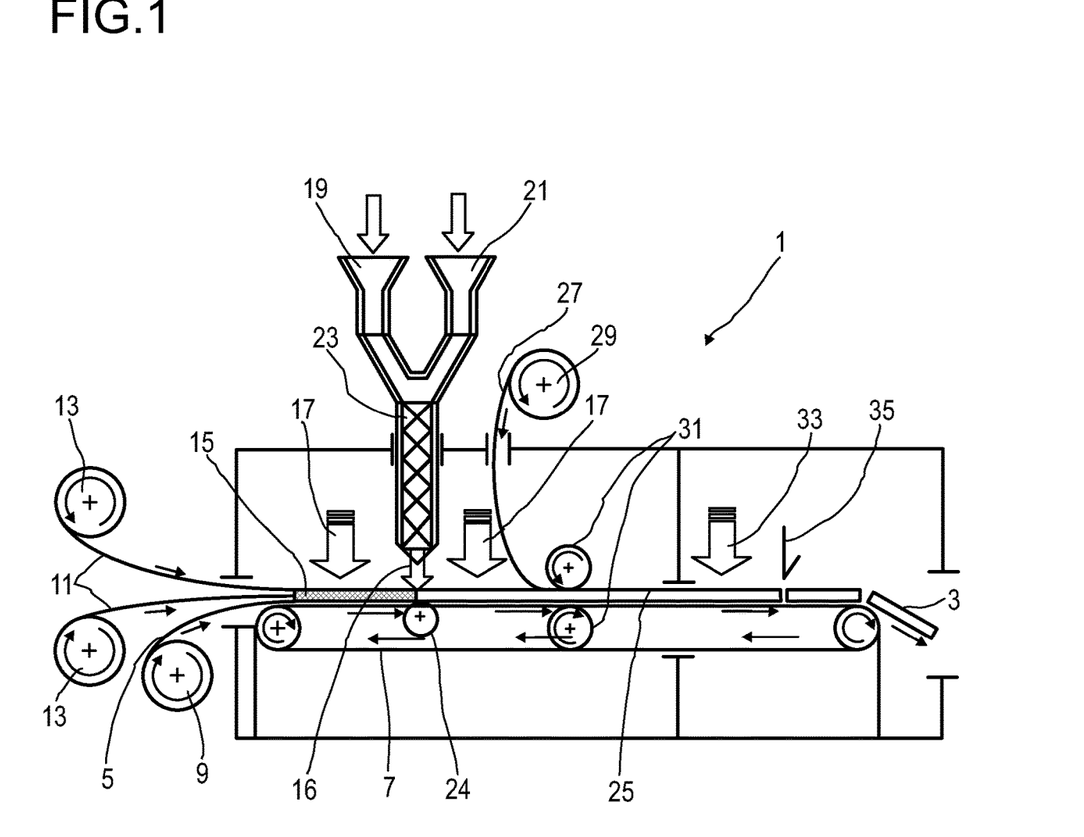
FIG. 1 is a diagram of the process of the invention for the production of a saturated fiber structure.

A first foil 5 is introduced into an apparatus 1 for the production of a saturated fiber structure. In the embodiment depicted here, the first foil 5 is placed onto a conveyor belt 7. A suitable conveyor belt 7 is any desired conveyor belt that is known to the person skilled in the art and that can transport the foil 5. The design of the surface of the conveyor belt 7 here is such that the foil 5 is not damaged by the motion of the conveyor belt 7 or during application to the conveyor belt 7. In order that the process can be operated continuously, the foil 5 is held on a roll 9, from which it is unwound and introduced into the apparatus 1.

In the embodiment depicted here, two layers of fibers 11 are laid on the foil 5. The fibers 11 here can take the form of woven fabric, knitted fabric, laid scrim, nonwoven, or of parallel-oriented fibers, yarns, threads, or cords. If parallel-oriented fibers are used, it is preferable to orientate the fibers of the individual layers at an angle to one another, preferably at an angle of 90° to one another. The addition of the fibers 11 likewise takes place continuously, and the fibers 11 here are held on a roll 13. The fibers 11 laid on the foil 5 form the fiber structure 15 to be saturated.

In order to obtain uniform wetting of the fibers of the fiber structure 15 with lactam, the fiber structure 15 is preferably heated. FIG. 1 uses arrows 17 to depict the heat supply. After the heating, molten lactam is applied to the fiber structure 15. The molten lactam preferably comprises at least one catalyst which catalyzes the anionic polymerization to give polyamide, and also optionally comprises at least one activator. The material can also comprise other additives which can influence the properties of a polyamide produced from the lactam. The temperature to which the fiber structure 15 is heated preferably corresponds to the melting point of the lactam used. The temperature is preferably in the range from 70 to 90° C. During the heating, care has to be taken that the temperature of the molten lactam and the temperature to which the fiber structure 15 is heated are kept below the onset temperature for the anionic polymerization of the lactam. A nozzle 16 is used in the invention for the application of the molten lactam, and applies the lactam in the form of a narrow line to the fiber structure 15. The nozzle 16 here preferably has a circular nozzle aperture of diameter at most 2 mm. The line here is preferably parallel to the lateral peripheries of the fiber structure 15. If the width of the fiber structure 15 is great, or if the quantity of lactam introduced via a nozzle 16 is inadequate to apply, to the fiber structure 15, the quantity of lactam desired for the production of the saturated fiber structure 3, it is also possible to use a plurality of nozzles 16 arranged parallel alongside one another, preferably at equal distances.

In the embodiment depicted here, the following are added to a mixing unit 23: molten lactam with activator by way of a first inlet 19 and molten lactam with catalyst by way of a second inlet 21. The mixing unit can by way of example take the form of extruder or else of static mixer. A homogeneous mixture of the lactam with activator and catalyst is produced in the mixing unit. The molten lactam comprising activator and comprising catalyst is applied via the nozzle 16 to the textile structure 15.

In the embodiment depicted here there is a temperature-controllable roll 24 below the nozzle 16. The temperature of the roll 24 can preferably be controlled in the range from −30° C. to 100° C. The temperature of the roll 24 here is adjusted in such a way as to adjust the viscosity of the solution applied via the nozzle 16 to a value that firstly permits uniform distribution of said solution in the fiber structure 15 but secondly also prevents premature reaction of the monomer at this location to give the polymer. The temperature selected is moreover also not permitted to be so low that the solution solidifies in the fiber structure 15, since that can result in production of cavities and defects in the component to be produced from the saturated fiber structure.

In the embodiment depicted here, a second foil 27 is applied to the saturated fiber structure 25 after the saturation process. The second foil 27 here is preferably, like the first foil 5, unwound from a roll 29 on which it is held.

In a following step, the saturated fiber structure 25 is passed through a roll pair 31, where pressure is exerted on the saturated fiber structure 25. The distance between the rolls of the roll pair 31 here is preferably from 1 to 1.5 times the thickness of the unsaturated fiber structure 15 plus the thickness of the conveyor belt 7 and of the foil 5.

In an embodiment not depicted here, at least one further fiber layer is applied on the upper side and/or the underside of the saturated textile structure after the saturation process. It is preferable here that the fibers additionally applied are of the same type as the fibers 11 which form the textile structure 15. However, it is also alternatively possible that the fibers that form the fiber structure 15 are by way of example individual layers of parallel-oriented fibers, yarns, threads, or cords, or that a nonwoven forms the fiber structure 15, and that the additional layers are woven fabrics or knitted fabrics.

The compression of the saturated fiber structure 25 also forces lactam into the fiber layers additionally applied, and the fiber layers additionally applied are thus likewise saturated with lactam.

After compression, the saturated fiber structure 25 is cooled. An arrow 33 depicts this. The cooling solidifies the lactam, and a fiber structure comprising solid lactam is produced. This can then be further processed by using a cutter 35, for example a blade, a punch, or a saw, to give a flat fiber-reinforced semifinished product 3.

Figure 2:
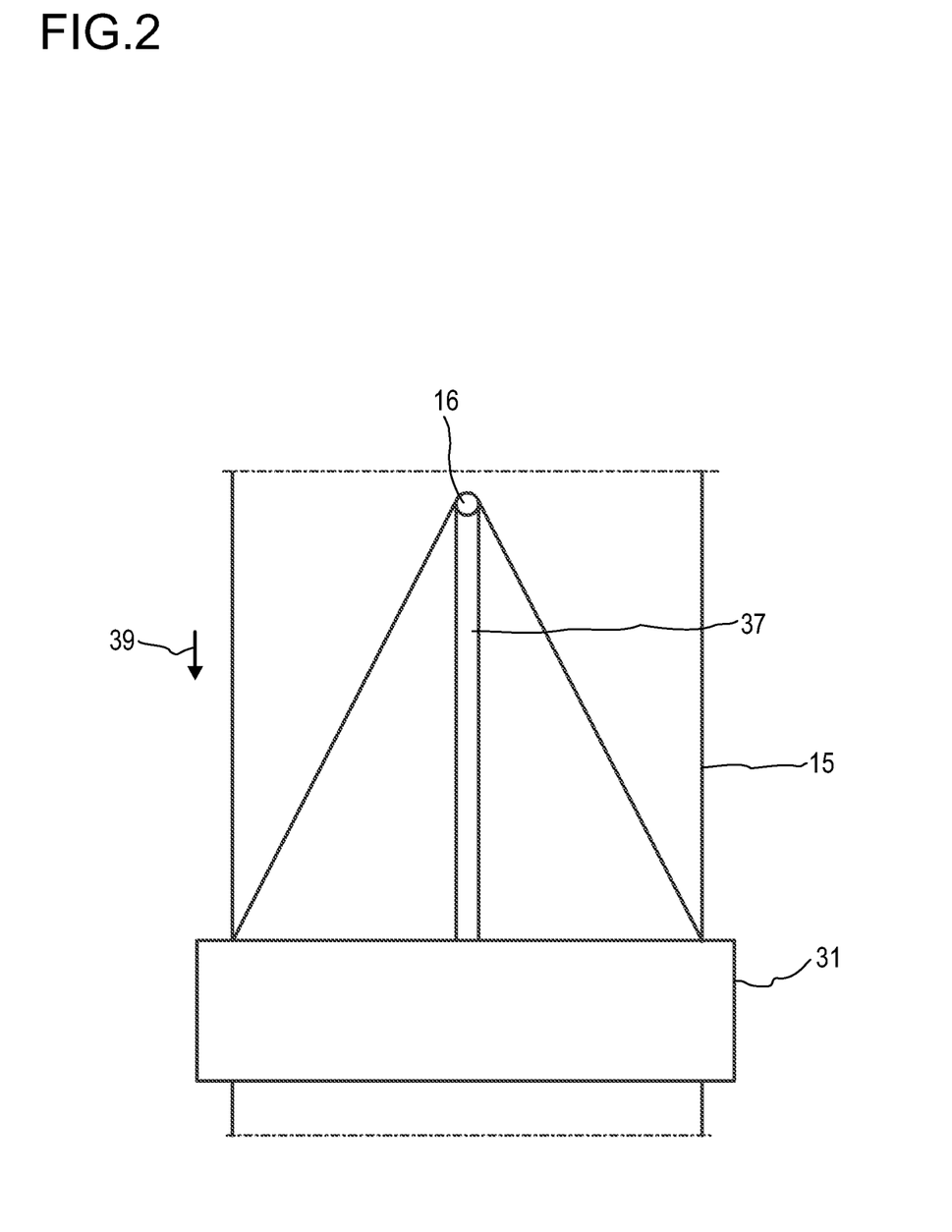
FIG. 2 is a plan view of the fiber structure between application of the solution comprising monomer and optionally comprising activator, and optionally comprising catalyst and the roll pair.

FIG. 2 is a plan view of the fiber structure between application of the solution comprising monomer and optionally comprising activator, and optionally comprising catalyst and the roll pair.

The plan view in FIG. 2 shows how the solution comprising monomer and optionally comprising activator, and optionally comprising catalyst is first applied via the nozzle 16 in the form of a line 37 to the fiber structure 15. By virtue of the porosity of the fiber structure 15 and of the low viscosity of the solution, the solution flows through the fiber structure 15 and becomes distributed across the width of the fiber structure 15. On passage through the roll pair 31, the solution is then also forced into the regions of the fiber structure 15 that have not previously been wetted. The arrow 39 depicts the direction of transport of the fiber structure 15.

Figure 3:
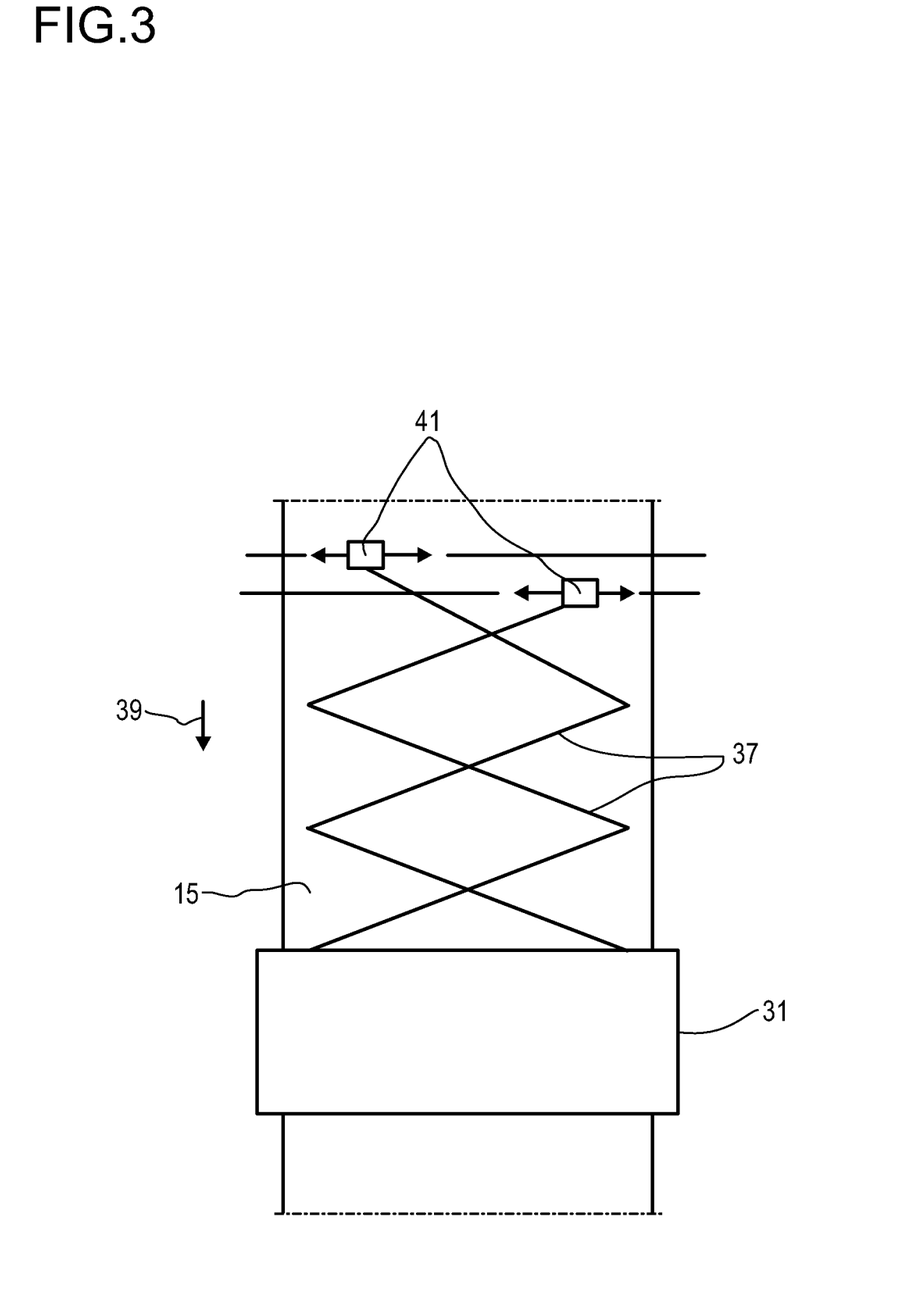
FIG. 3 is a plan view of the fiber structure between application of the solution comprising monomer and the roll pair when the solution is applied in zigzag lines.

FIG. 3 depicts an alternative embodiment for the application of the lines of the solution comprising monomer and optionally comprising activator, and optionally comprising catalyst.

In the embodiment depicted in FIG. 3, unlike in the embodiment depicted in FIG. 2, the lines 37 are applied in a zigzag shape. The lines here intersect in an axis of symmetry running centrally on the fiber structure 15, and the points at which the direction of application changes are, for each of the two lines 37, on a line running in the direction 39 of transport. In an example of a method permitting achievement of zigzag application, each of the nozzles 16 can be held in a linear unit 41, and in order to achieve symmetrical application here the linear units 41 are moved in opposite directions perpendicularly to the direction 39 of transport of the fiber structure 15.

Figure 4:
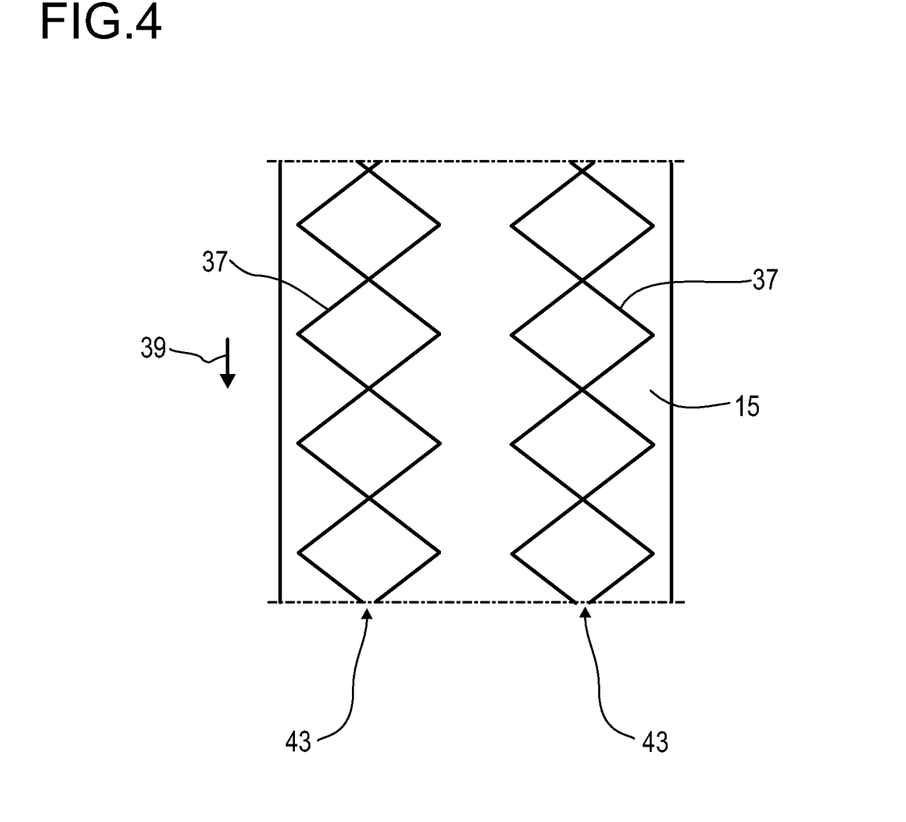
FIG. 4 is a plan view of a fiber structure with application of the solution comprising monomer in two line systems.
Figure 5:
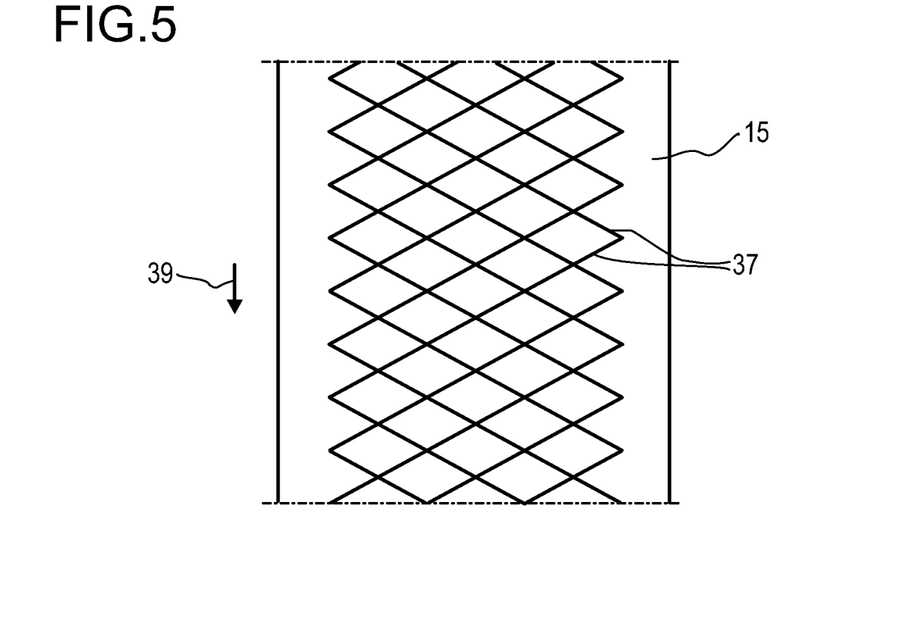
FIG. 5 is a plan view of a fiber structure with application of the solution comprising monomer in a plurality of overlapping lines.

FIGS. 4 and 5 depict other possible alternatives of possible modes of application of the solution comprising monomer and optionally comprising activator, and optionally comprising catalyst.

In the case of the embodiment depicted in FIG. 4, the solution comprising monomer and optionally comprising activator, and optionally comprising catalyst is applied in two line systems 43 to the fiber structure 15. In the embodiment depicted here, each line system 43 comprises two mutually overlapping zigzag lines 37 with axial symmetry. The individual line systems 43 here are likewise symmetrical with respect to an axis of symmetry running in the direction of transport of the fiber structure, but there is no contact between, or intersection of, the line systems 43.

In the embodiment depicted in FIG. 5, the solution comprising monomer and optionally comprising activator, and optionally comprising catalyst is applied in a plurality of parallel zigzag lines 37, and the individual lines 37 here respectively intersect, and the points at which the direction of the lines changes are respectively, for all of the lines, on a line located in the direction 39 of transport of the fiber structure.

Alongside the variants depicted here for the application of the solution comprising monomer and optionally comprising activator, and optionally comprising catalyst, any other variant or combination of the variants depicted here is also possible. The lines can moreover also have an undulating shape instead of the zigzag shape.

For the production of components, the flat fiber-reinforced semifinished product is inserted into a mold heated to a temperature at which the lactam polymerizes anionically to give the polyamide. The heating to a temperature above the onset temperature of the anionic polymerization polymerizes the lactam with which the textile structures have been saturated, to give the corresponding polyamide. The simultaneous compression converts the flat fiber-reinforced semifinished product to the desired shape of the component to be produced.

Examples of components that can be produced in this way are components of vehicle bodywork, structural components for vehicles, for example floors or roofs, constituent components for vehicles, for example assembly supports, seat structures, door cladding or interior cladding, and also components for wind turbines or rail vehicles.

KEY

1 Apparatus for the production of flat fiber-reinforced semifinished products
3 Flat fiber-reinforced semifinished product
5 Polyamide foil
7 Conveyor belt
9 Roll with polyamide foil
11 Fiber
13 Roll holding fiber
15 Fiber structure
16 Nozzle
17 Heat supply
19 First inlet
21 Second inlet
23 Mixing unit
24 Roll
25 Saturated fiber structure
27 Second polyamide foil
29 Roll holding second polyamide foil
31 Roll pair
33 Cooling
35 Cutter
37 Line
39 Direction of transport of fiber structure 15
41 Linear unit
43 Line system

The invention claimed is:

1. A process for the production of saturated fiber structures, the process comprising:
   (a) placing a fiber structure onto a conveyor belt and moving the fiber structure on the conveyor belt in a direction of transport,
   (b) applying a liquid mixture comprising a molten monomer to the fiber structure in a plurality of lines, each of the plurality of lines having an undulating or zigzag shape, wherein:
   the plurality of lines comprises an even number of lines and the plurality of lines are applied with axial symmetry to the fiber structure with respect to an axis running in the direction of transport of the fiber structure, or
   the plurality of lines comprises at least two lines and the lines intersect with each other,
   (c) exerting pressure on the fiber structure with the applied liquid mixture by passing the fiber structure with the applied liquid mixture through a roll pair, to obtain a saturated fiber structure, wherein the roll pair comprises a pair of rolls, and
   (d) cooling the saturated fiber structure, so that the molten monomer solidifies.

2. The process according to claim 1, wherein the liquid mixture comprising the molten monomer is applied to the fiber structure in a plurality of lines in step (b) by using nozzles which have an aperture diameter of at most 5 mm.

3. The process according to claim 1, wherein a distance between a location where the liquid mixture is applied to the fiber structure in step (b) and the roll pair through which the fiber structure is passed in step (c) is at most 3 m.

4. The process according to claim 1, wherein the liquid mixture comprising the molten monomer has a viscosity in the range from 5 to 500 mPa·s.

5. The process according to claim 1, wherein the fiber structure has a thickness and the distance between the rolls of the roll pair is from 1 to 1.5 times the thickness of the fiber structure.

6. The process according to claim 1, wherein the fiber structure is moved on the conveyor belt at a transport velocity and the liquid mixture comprising the molten monomer is applied with a total flow rate, wherein the total flow rate and the transport velocity are selected in such a way that after passage of the fiber structure with the applied liquid mixture through the roll pair a content of fibers in the saturated fiber structure is from 20 to 70% by volume.

7. The process according to claim 1, wherein the monomer is a lactam.

8. The process according to claim 7, wherein the lactam is selected from the group consisting of caprolactam, piperidone, pyrrolidone, lauryllactam, and a mixture of these.

9. The process according to claim 7, wherein the liquid mixture further comprises at least one lactone monomer, the at least one lactone monomer being provided in an amount of up to 50% by volume of the monomers in the liquid mixture.

10. The process according to claim 9, wherein the at least one lactone monomer comprises caprolactone.

11. The process according to claim 7, wherein the liquid mixture has a temperature in the range from 80 to 120° C. when applied in step (b), and the roll pair has a temperature of at most 100° C.

12. The process according to claim 1, wherein the fiber structure is selected from the group consisting of a woven fabric, laid scrim, nonwoven, knitted fabric, braided fabric, and rovings.

13. The process according to claim 1, wherein the fiber structure comprises fibers selected from the group consisting of glass fibers, carbon fibers, aramid fibers, steel fibers, potassium titanate fibers, basalt fibers, ceramic fibers, and mixtures thereof.

14. The process according to claim 1, wherein the liquid mixture comprising the molten monomer further comprises at least one of an activator and a catalyst.

* * * * *